UNITED STATES PATENT OFFICE.

DAVID ROOSE-JONES, OF BIRMINGHAM, ENGLAND.

DETERGENT.

SPECIFICATION forming part of Letters Patent No. 692,358, dated February 4, 1902.

Application filed November 12, 1900. Serial No. 36,184. (No specimens.)

*To all whom it may concern:*

Be it known that I, DAVID ROOSE-JONES, a subject of the Queen of Great Britain, residing at Handsworth, Birmingham, England, have invented a certain new and useful Composition of Matter for Use as a Polishing Material, of which the following is a full and complete specification, such as will enable those skilled in the art to which it appertains to make and use the same.

My composition consists of the following ingredients combined in the proportions stated, namely: washing-soda, twenty pounds; whiting, fifty pounds; borax, six pounds; kieselguhr, ten pounds; resin, six pounds; rouge, four ounces.

In practice the foregoing ingredients are combined in the following manner: The washing-soda is first dissolved in two quarts of water, and the other ingredients are then mingled therewith, and the product is then made up into a cake or ground into a powder, as may be desired, and the polishing material thus formed is used in the manner of ordinary soap.

My composition is particularly adapted for use as a polishing material for silverware, but may be used for polishing brass and any other metal, substances, or articles; and the said composition constitutes a polishing material by means of which a perfect polish may be given to all metallic substances, and particularly to silver articles of various kinds and classes.

I am aware that some of the articles which I employ have heretofore been used for a similar purpose; but I am not aware that all the ingredients of my composition have ever before been combined for the purpose specified.

Having fully described my invention, what I claim as new, and desire to secure by Letters Patent, is—

1. The herein-described composition of matter consisting of washing-soda, whiting, borax, kieselguhr, resin and rouge.

2. The herein-described composition of matter, consisting of washing-soda, twenty pounds, whiting fifty pounds, borax six pounds, kieselguhr ten pounds, resin six pounds, and rouge four ounces.

In testimony that I claim the foregoing as my invention I have signed my name, in presence of the subscribing witnesses, this 29th day of September, 1900.

DAVID ROOSE-JONES.

Witnesses:
E. HARKER,
G. T. COX.